United States Patent Office 3,102,029
Patented Aug. 27, 1963

3,102,029
PRINT-OUT PROCESS WITH ARYL AMINE AND POLYPHENYLMETHANE CARBINOLS
Harry L. Fichter, Jr., Lakewood, and William P. Hamilton, Cleveland, Ohio, assignors to Horizons Incorporated, a corporation of New Jersey
No Drawing. Filed June 23, 1961, Ser. No. 119,037
9 Claims. (Cl. 96—90)

This invention relates to a non-silver direct print-out system based on photosensitive compositions comprising arylamines and suitable halogen-containing organic compounds. More particularly, it relates to increasing the sensitivity of such photosystems by the addition thereto of relatively minute amounts of the carbinol bases of diphenylmethane and triphenylmethane dyes.

This application is a continuation-in-part of our copending application Serial No. 117,520, filed June 16, 1961.

The photographic systems to which the present invention applies are described in a number of patent applications filed by Eugene Wainer and others including United States patent application Serial No. 787,112, filed January 16, 1959, which issued July 3, 1962, as United States Patent 3,042,515, and also described in pages 98-103 of the March-April 1961 issue of Photographic Science and Engineering (vol. 5, Number 2).

The photographic systems of the type described, comprise the following:

(A) One or more organic halogen compounds,
(B) One or more suitable arylamines, and
(C) A suitable base material in which (A) and (B) are dispersed or on which a mixture of (A) and (B) may be supported in the form of a thin film or coating.

(A) ORGANIC HALOGEN COMPOUND

The halogen-containing compounds suitable in the photosystem of the present invention are those which release halogen free-radicals when exposed to a proper dose of radiant energy and which may be represented by the generalized formula:

$$ACX_3$$

wherein A is a monovalent radical selected from the group consisting of H, Cl, Br, I, unsubstituted alkyl, substituted alkyl, unsubstituted aryl and substituted aryl; and each X is selected from the group consisting of Cl, Br, and I.

Carbon tetrabromide is a particularly preferred member of this class and other preferred members are the following substituted methanes and substituted ethanes: $CBr_4$, $CCl_4$, $HCBr_3$, $HCCl_3$; $HCBr_3$; $C_2Br_6$; $C_2Cl_6$; $C_2HBr_5$; and $C_6H_5CBr_3$.

Each of the above compounds yields a halogen free-radical when the bond joining a halogen atom to a polyhalogenated carbon atom is ruptured upon exposure to light.

(B) ARYLAMINE

The arylamines which have been found suitable in the present photosystem include amines in which the amine nitrogen is attached to a benzene, naphthalene or anthracene nucleus diphenylamine being a particularly preferred arylamine for the present purposes. Such amines may be represented generally by the formula:

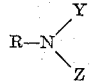

wherein R represents a phenyl, naphthyl or anthracyl nucleus, which may be substituted with alkyl, aryl or halogen groups and Y and Z are each alkyl, aryl, aralkyl, halogen or hydrogen.

(C) THE CARBINOL BASE

As compared with the prior art above noted, the photosystems of the present invention possess an enhanced sensitivity by virtue of the incorporation thereinto of a carbinol base of a diphenylmethane dye or triphenylmethane dye. Such bases may be represented by the general formulae

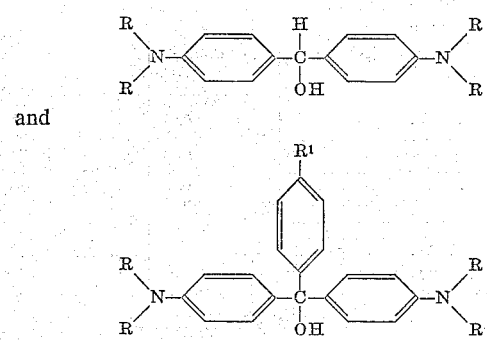

and wherein each R is selected from the group consisting of H, alkyl, aralkyl, and aryl and each R may be the same or differ from others; and $R^1$ represents a monovalent radical selected from the group consisting of —H and

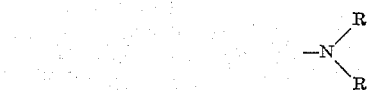

wherein R has the same meaning as above.

(D) CARRIER

A preferred method of formulating the photosensitive compositions of the invention is to prepare a solution of a film-forming plastic such as nitrocellulose, by dissolving the plastic in a solvent for the same, and to then add suitable amounts of the organic halogen-containing compound, the arylamine and the carbinol base to the solution of the film-forming plastic. Suitable carriers include synthetic polymers such as polyvinylchloride, polyvinyl acetate, the polyvinylidene chloride copolymer known as Saran, and the like, and such cellulose derivatives as ethyl cellulose, methyl cellulose, nitrocellulose, and the like. A host of other suitable carrier materials will readily suggest themselves to others skilled in this art.

(E) PROPORTIONS

Of the active ingredients in the photocompositions of this invention, the principal constituents, proportionwise, are the organic halogen compound and the arylamine. For each 10 parts by weight of the organic halogen compound, between about 0.01 and 100 parts by weight of the carbinol base has been found to noticeably enhance the sensitivity of the composition, the effect being most noticeable with about 1.5 parts by weight of carbinol base for each 10 parts by weight of organic halogen-containing compound.

The amount of arylamine may be varied according to the total amount of organic halogen-containing compound present, from between about 0.5 part by weight per part of organic halogen-containing compound to about 5 parts by weight per part of organic halogen-containing compound.

The following examples will serve to further illustrate the improvement in sensitivity obtained by the practice of this invention.

*Example 1*

Five hundred milligrams of Michler's hydrol were added to 16 cc. of a 3% ethyl cellulose solution in toluene containing 2.4 grams of diphenylamine, 2.8 grams of carbon tetrabromide, and 0.6 gram of hexachloroethane.

The mixture was coated on polyvinyl chloride sheets at .0015-inch wet thickness. When exposed to a 275 watt General Electric sunlamp, the Michler's hydrol-bearing samples exhibited substantial increases in density as compared with control samples containing no Michler's hydrol, as evidenced by the table below. Samples were fixed by washing in toluene to remove unreacted starting materials.

| Exposure, Seconds | Net Transmission Density Read on Eastman Densitometer Through the Green Filter | |
|---|---|---|
| | No Michler's Hydrol | With Michler's Hydrol |
| 1 | 0.06 | 0.20 |
| 2 | 0.21 | 0.50 |
| 3 | 0.30 | 0.57 |
| 4 | 0.37 | 0.61 |
| 5 | 0.39 | 0.65 |
| 6 | 0.44 | 0.69 |
| 7 | 0.46 | 0.75 |
| 8 | 0.48 | 0.77 |
| 9 | 0.50 | |
| 10 | 0.50 | 0.78 |

*Example 2*

Five hundred milligrams of the carbinol base of the triphenylmethane dye, Opal Blue SS (C.I. 42760) were dissolved in 4 cc. of methanol and added to 16 cc. of a 3% ethyl cellulose solution in toluene containing 2.4 grams of diphenylamine, 2.8 grams of carbon tetrabromide and 0.6 gram of hexachloroethane. Because of its extreme sensitivity to residual acid, which rapidly converts the carbinol base to its colored form, one drop of triethylamine was added to the above mix to keep it as color-free as possible. The mixture was coated on polyvinyl chloride sheets at .0015-inch wet thickness. On exposure to a General Electric sunlamp, the sample containing the carbinol base exhibited over six times the density of the control sample with no carbinol base.

The table below lists the density measurements for various exposures. A similar mix was made, using only 50 mg. of the carbinol base of Opal Blue. It also shows substantial increases in density when compared to the control. Results of this reduced base concentration are included in the table for comparison. All samples were fixed by washing in toluene to remove the unreacted starting materials.

| Exposure, Seconds | Net Transmission Densities Read on an Eastman Densitometer Through the Green Filter | | |
|---|---|---|---|
| | Control | Carbinol Base of Opal Blue | |
| | | 500 mg. | 50 mg. |
| 1 | 0.07 | 0.43 | 0.42 |
| 2 | 0.17 | 0.68 | 0.58 |
| 3 | 0.22 | 0.78 | 0.65 |
| 4 | 0.27 | 0.91 | 0.66 |
| 5 | 0.24 | 1.00 | 0.67 |
| 6 | 0.33 | 1.08 | 0.65 |
| 7 | 0.30 | 1.10 | 0.62 |
| 8 | 0.38 | 1.10 | 0.65 |
| 9 | 0.46 | 1.20 | 0.65 |
| 10 | 0.51 | 1.29 | |

Other extraneous additives may be included in the photosystem of the present invention to impart special properties to the system, e.g. to improve fixing, or sensitivity to light of specific wavelengths or the like, as described in the aforementioned prior art, without departing from the invention which is not intended to be limited except by the appended claims.

We claim:

1. In a non-silver, direct print-out photosensitive composition comprising a mixture of (a) at least one photolytically active organic halogen-containing hydrocarbon compound selected from the group consisting of organic halogen containing compounds which release halogen free radicals when exposed to a proper dose of radiant energy and which are represented by the general formula $$ACX_3$$

wherein A is selected from the group consisting of H, Cl, Br, I, alkyl, aryl; and each X is selected from the group consisting of Cl, Br and I and (b) at least one aryl amine represented by the formula

wherein R is an aromatic nucleus selected from the group consisting of phenyl, naphthyl and anthracyl; and Y and Z are each selected from the group consisting of alkyl, aryl, aralkyl, halogen and hydrogen the improvement which comprises including therein to enhance the sensitivity of the composition, (c) at least one carbinol base of a dye selected from the group consisting of diphenylmethane dyes and triphenylmethane dyes represented by the general formula

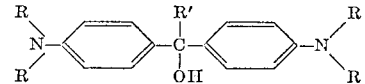

wherein each R is selected from the group consisting of H, alkyl, aralkyl and aryl and R' represents a member selected from the group consisting of H, phenyl and

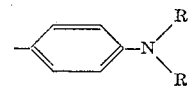

wherein R has the same meaning as above, and there being between 0.5 and 5 parts by weight of arylamine for each part by weight of organic halogen compound present in the composition and between 0.001 and 10 parts by weight of carbinol base for each part by weight of organic halogen compound present in the composition.

2. The composition of claim 1 dispersed in a clear film-forming plastic.

3. The composition of claim 2 as a self-supporting film.

4. An article comprising the composition of claim 1 as a coating on a solid supporting surface.

5. The composition of claim 1 wherein the amine is diphenylamine and the halogen compound is a halogen substituted lower alkane.

6. The composition of claim 5 wherein the carbinol base is Michler's hydrol.

7. The composition of claim 5 wherein the halogen compound is $CBr_4$.

8. The composition of claim 1 wherein there are between about 0.01 and 5.0 parts of carbinol base for each 10 parts of organic halogen compound by weight.

9. A process for producing a direct print-out image which comprises exposing a photosensitive mixture as defined in claim 1 to radiant energy.

References Cited in the file of this patent

UNITED STATES PATENTS

| 1,655,127 | Beebe | Jan. 3, 1928 |
| 2,325,038 | Chalkley | July 27, 1943 |
| 3,042,515 | Wainer | July 3, 1962 |
| 3,046,209 | Sprague | July 24, 1962 |

OTHER REFERENCES

Sprague et al.: Photographic Science and Engineering, vol. 5, No. 2, March–April 1961, pp. 98–100.